(12) United States Patent
Anderson et al.

(10) Patent No.: US 8,493,387 B2
(45) Date of Patent: *Jul. 23, 2013

(54) ACCELERATED STATISTICAL RENDERING METHODS AND APPARATUS

(75) Inventors: John Anderson, San Anselmo, CA (US); Mark Meyer, San Francisco, CA (US)

(73) Assignee: Pixar, Emeryville, CA (US)

( * ) Notice: Subject to any disclaimer, the term of this patent is extended or adjusted under 35 U.S.C. 154(b) by 1395 days.

This patent is subject to a terminal disclaimer.

(21) Appl. No.: 11/562,647

(22) Filed: Nov. 22, 2006

(65) Prior Publication Data

US 2007/0139432 A1    Jun. 21, 2007

Related U.S. Application Data

(60) Provisional application No. 60/762,285, filed on Jan. 25, 2006, provisional application No. 60/739,276, filed on Nov. 23, 2005.

(51) Int. Cl.
*G06T 15/50* (2011.01)

(52) U.S. Cl.
USPC .......................................... 345/426; 345/582

(58) Field of Classification Search
CPC ....................................................... G06T 15/50
USPC .......................................... 345/586, 582, 426
See application file for complete search history.

(56) References Cited

U.S. PATENT DOCUMENTS

| | | | |
|---|---|---|---|
| 4,897,806 A * | 1/1990 | Cook et al. | 345/426 |
| 5,262,871 A | 11/1993 | Wilder et al. | |
| 5,369,738 A | 11/1994 | Bremner, III | |
| 5,465,308 A | 11/1995 | Hutcheson et al. | |
| 5,977,977 A * | 11/1999 | Kajiya et al. | 345/418 |
| 6,226,005 B1 | 5/2001 | Laferriere | |
| 6,567,083 B1 | 5/2003 | Baum et al. | |
| 6,573,890 B1 | 6/2003 | Lengyel | |
| 6,677,957 B2 | 1/2004 | Grzeszczuk et al. | |
| 7,133,041 B2 | 11/2006 | Kaufman et al. | |
| 7,133,070 B2 | 11/2006 | Wheeler et al. | |
| 7,286,143 B2 * | 10/2007 | Kang et al. | 345/629 |
| 7,348,977 B2 | 3/2008 | West et al. | |
| 7,471,291 B2 | 12/2008 | Kaufman et al. | |
| 7,755,627 B2 * | 7/2010 | Anderson et al. | 345/426 |
| 7,969,433 B2 * | 6/2011 | Anderson et al. | 345/426 |
| 8,164,590 B1 * | 4/2012 | Anderson et al. | 345/426 |
| 2009/0141026 A1 * | 6/2009 | Raab et al. | 345/424 |

OTHER PUBLICATIONS

International Search Report of Oct. 16, 2007 for PCT Application No. PCT/US2006/045389, 4 pages.
Office Action of Apr. 29, 2009 for U.S. Appl. No. 11/562,658, 14 pages.
Office Action of Apr. 30, 2009 for U.S. Appl. No. 11/562,651, 11 pages.

* cited by examiner

*Primary Examiner* — Jeffery A Brier
(74) *Attorney, Agent, or Firm* — Kilpatrick Townsend & Stockton LLP

(57) ABSTRACT

A method for a computer system includes performing rendering operations for a plurality of scenes to form a plurality of intermediate rendering data in response to a plurality of scene descriptor data associated with the plurality of scenes, processing the plurality of intermediate rendering data to form a model for the plurality of intermediate rendering data, and determining a higher quality plurality of intermediate rendering data in response to the model for the plurality of intermediate rendering data.

36 Claims, 10 Drawing Sheets

ACCELERATED STATISTICAL RENDERING METHODS AND APPARATUS

CROSS-REFERENCE TO RELATED APPLICATIONS

The present invention claims priority to, and incorporates by reference for all purposes, U.S. Provisional Patent Application No. 60/739,276, filed Nov. 23, 2005 and U.S. Provisional Patent Application No. 60/762,285, filed Jan. 25, 2006. The present invention is related to and incorporates by reference for all purposes: Application No. 11/562,658, filed Nov. 22, 2006, titled "Global Illumination Filtering Methods And Apparatus" and to U.S. patent application No. 11/562,651, filed Nov. 22, 2006, titled "Methods And Apparatus For Determining High Quality Sampling Data From Low Quality Sampling Data". The present invention also incorporates by reference for all purposes: U.S. patent application No. 10/428,321, filed Apr. 30, 2003 and U.S. Pat. No. 4,897,806 issued Jan. 30, 1990.

BACKGROUND OF THE INVENTION

The present invention relates to computer animation. More specifically, the present invention relates to methods and apparatus for filtering of illumination effects for computer animation.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CA, and CA software now known as RenderMan®. RenderMan® was particularly well received in the animation industry and recognized with two Academy Awards®. The RenderMan® software included a "rendering engine" that "rendered" or converted geometric and/or mathematical descriptions of objects into intermediate rendering data and/or into two dimensional image representations.

One of the most accurate and straightforward approaches to determining global illumination (including direct and non-direct illumination) for rendering scenes in computer graphics is with ray tracing. In this method, a rendering engine casts a large number of rays from either light sources or surface points, or both, for the purpose of evaluating light transport paths and connectivity, including diffuse bounces, between surface points and the lights.

One drawback with current ray tracing techniques is that it is necessary to cast a large number of rays in order to produce an accurate value for the path integral. For animated features this is an especially severe limitation because of the time-consuming nature of ray tracing. With the large number of images that are rendered in a feature animation, the total number of ray tracing operations is prohibitively high.

A drawback noted by the inventors is that the casting of rays is different for different rendered images. Accordingly, for rendered images that are played-back to a user, unacceptable flickering or buzzing artifacts may appear because of the different sample points between frames. Such artifacts may make surfaces appear as a sparkling, flickering, or animated when such surfaces are supposed to be uniform in appearance.

One technique that may be used to address these drawback is to greatly increase the number of stochastic rays cast for each image to be rendered. In some known examples, the number of rays cast per pixel may be on the order of 500 to 1000. This solution, however is very time consuming and dramatically increases the total rendering time.

FIGS. 2A-E illustrates a series of screen sequences in which non-direct illumination changes versus time. More specifically, FIGS. 2A-E illustrates low-sampling-resolution ray-traced rendered images of a three dimensional scene having fixed geometric elements where an illumination source moves circularly in space with respect to time. In this example, the number of rays cast per pixel is relatively low, e.g. 16 rays /pixel, thus as can be seen in FIGS. 2A-E, the resulting images 200-240 have significant noise and noise-related artifacts. For example, as seen in images 200-220, the portions 310, 320, 325 representing the floor of the box appears very grainy or textured, although the floor of the box should appear smooth or not-textured. Additionally, carefully comparing images 200-220 the apparent texture of the floor is not the same between the images. To a user who views images 200-220 successively, as in an animation, the floor of the box will appear to "sparkle" or "hiss."

Another type of noise-related artifact is seen in images 230 and 240. In image 230, the portion 330 representing the back wall has a discernable pattern 340; and in image 240, the portion 345 representing the back wall also has a discernable pattern 350. These patterns are typically different. Discernable patterns 330 and 340 are distracting artifacts within images 230 and 240. Additionally, as a discussed above, when image 230 and 240 are successively displayed to a user, for example in the form of an animation, discernable patterns 330 and 340 make the back wall appear to "creep" or fluctuate, although the back wall should be stationary. Such patterns are often a result of assumptions made during a rendering operation, and are often dependent upon the rendering engine used.

Another technique used to address these drawbacks is by post-processing of the rendered image with a low-pass filter. A drawback to such processes is that fine geometric features of an object, such as corners, creases, hair, etc, will be blurred in the rendered image. As a result, the blurred rendered image will appear dull and will not appear as sharp or crisp to the audience.

Accordingly, what is desired are improved methods and apparatus for improved rendered images without the drawbacks discussed above.

BRIEF SUMMARY OF THE INVENTION

The present invention relates to computer animation. More specifically, the present invention relates to methods and apparatus for increasing the quality of illumination of computer generated images.

Global illumination provides important visual cues to an animation, however its computational expense limits its use in practice. In this patent disclosure, easy to implement techniques for accelerating the computation of indirect illumination for an animated sequence using stochastic ray tracing are described. In various embodiments, quick but noisy global illumination solutions are computed using a small number of sample rays at each sample location. Then, in various embodiments, the variation of these noisy solutions over time is then used to create a smooth basis. Finally, in various embodiments, the noisy solutions are projected onto the smooth basis to produce a final solution. The resulting frame of animation has greatly reduced spatial and temporal noise. Another benefit for various embodiments, includes that these techniques are not computational intensive, and tend to cost roughly the same as noisy, low sample computations.

The embodiments of the present invention described herein represent novel techniques for filtering non-direct illumination contributions for computer-generated images. The non-direct contributions are combined with direct illumination contributions during the rendering process to determine the global illumination contributions. With embodiments of the present embodiment, the quality of global illumination (and non-direct illumination) for rendered images are much higher than was previously obtainable for the same number of cast rays per pixel. In other embodiments of the present invention, the quality of illumination of rendered images are the same as was previously obtainable, however, the number of cast rays per pixel is decreased. Accordingly, the time to render and form such images is reduced by up to several orders of magnitude for scenes of reasonable length.

In embodiments of the present invention, scene descriptors for more than one scene are used to determine rendering data for a single scene. Mathematically, the relationship may be represented as: $R_i = f(r_1, r_2, r_3, r_M)$, where $r_i$ is a set of intermediate rendering data associated with scene descriptor $i = \{1 \ldots M\}$, and $R_i$ is a set of additional intermediate rendering data associated with scene descriptor $i = \{1 \ldots M\}$. As can be seen, $R_i$ is a function of intermediate rendering data associated with more than one scene. In the specific examples as will be described and illustrated, in FIGS. 2A-2E, $r_1$, $r_2$, $r_3$, ... $r_M$ are intermediate rendering data illustrated as low sampling resolution images respectively determined from scene descriptors 1 ... M. Further, the function f is determining the "N" more fundamental intermediate rendering data modes, e.g. illumination modes, basis functions (e.g. FIGS. 5A-5E) from intermediate rendered data: $r_1, r_2, r_3, \ldots r_M$ and "N" specific illumination mode weights for respective scene descriptors 1 ... M. As illustrated in FIGS. 6A-6E, $R_1, R_2, R_3, R_M$, are additional intermediate rendered data illustrated as high sampling resolution images.

Various embodiments of the present invention include methods for determining intermediate rendering data modes from a number of initial renderings of three-dimensional objects. The three-dimensional objects are described in a series of related scene descriptors (descriptions). In one example, the intermediate rendering data may be a series of initial rendered images from scene-descriptors making-up a shot, where each initial rendered image alone may contain unacceptable levels of noise (e.g. images where pixels have a low number of cast rays per pixel). In various embodiments, the method includes using data extracted from the initial rendered images to determine a additional intermediate or secondary rendering data. The secondary rendering data may be additional intermediate rendering data and/or a series of rendered images. In the example above, the additional intermediate rendering data may be a series of rendered images that have acceptable levels of noise (e.g. images where pixels have a high number of cast rays per pixel.)

In embodiments of the present invention, described below, the noise level of a series of secondary rendered images may roughly be equivalent to that which would have been achieved if the number of sample rays cast rays per pixel "M" was multiplied by the number of related scene descriptors to render "N" (e.g. N rendered images to be formed) in the series of related scene descriptors (i.e. M×N). For example, in a case where there are 100 related scene descriptors, and the number of rays cast per pixel are 16, each secondary rendered image will appear to have approximately the same illumination smoothness as though 1600 rays were cast per pixel in the initial rendered image. As a result, a benefit from the above example technique includes that residual noise is correlated from rendered image frame to rendered image frame, i.e. the sparkling or popping artifacts between different rendered images are greatly reduced.

In various embodiments the set of related scene descriptors may include any sequence of scene descriptors where the scene geometry has not appreciably changed. The sequence of scene descriptors may include scenes where the cameras are positioned at different locations, where the objects in a scene move, and the like.

Another benefit with embodiments of the present invention is that the flickering artifacts, i.e. artifacts that appear to have moving on static surfaces is greatly reduced. Yet another benefit to embodiments is that sharp or fine geometric features are preserved in a rendered image. Accordingly the rendered image appears sharp and crisp to the audience.

According to one aspect of the invention, a method for a computer system is disclosed. Various techniques include performing rendering operations for a plurality of scenes to form a plurality of intermediate rendering data in response to a plurality of scene descriptor data associated with the plurality of scenes. Processes may include processing the plurality of intermediate rendering data to form a model for the plurality of intermediate rendering data. Steps may include determining a higher quality plurality of intermediate rendering data in response to the model for the plurality of intermediate rendering data.

According to another aspect of the invention, a computer program product on a computer-readable tangible media for a computer system including a processor is described. Various media include code that directs the processor to perform first rendering operations for a plurality of scenes to form a plurality of intermediate data in response to a plurality of scene descriptor data associated with the plurality of scenes and code that directs the processor to determine a model for the plurality of intermediate data in response to the plurality of intermediate data. A computer program product may include code that directs the processor to perform second rendering operations for the plurality of scenes to form a higher quality plurality of intermediate data in response to the model for the plurality of intermediate data. The codes may reside on a computer readable tangible media such as optical media (DVD, HD DVD, Blu Ray DVD, holographic media, and the like), magnetic media (hard disk drive, floppy disk drive, and the like), semiconductor media (flash memory, RAM, ROM, and the like).

According to yet another aspect of the invention, a computer system is described. An apparatus includes a memory configured to store a plurality of scene descriptor data associated with a plurality of scenes, and a processor coupled to the memory, wherein the processor is configured to perform rendering operations for the plurality of scenes to form a plurality of intermediate rendering data in response to the plurality of scene descriptor data. In various embodiments, the processor is configured to process the plurality of intermediate rendering data to form a model for the plurality of intermediate rendering data. In various embodiments, the processor is configured to determine a higher quality plurality of intermediate rendering data in response to the model for the plurality of intermediate rendering data.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
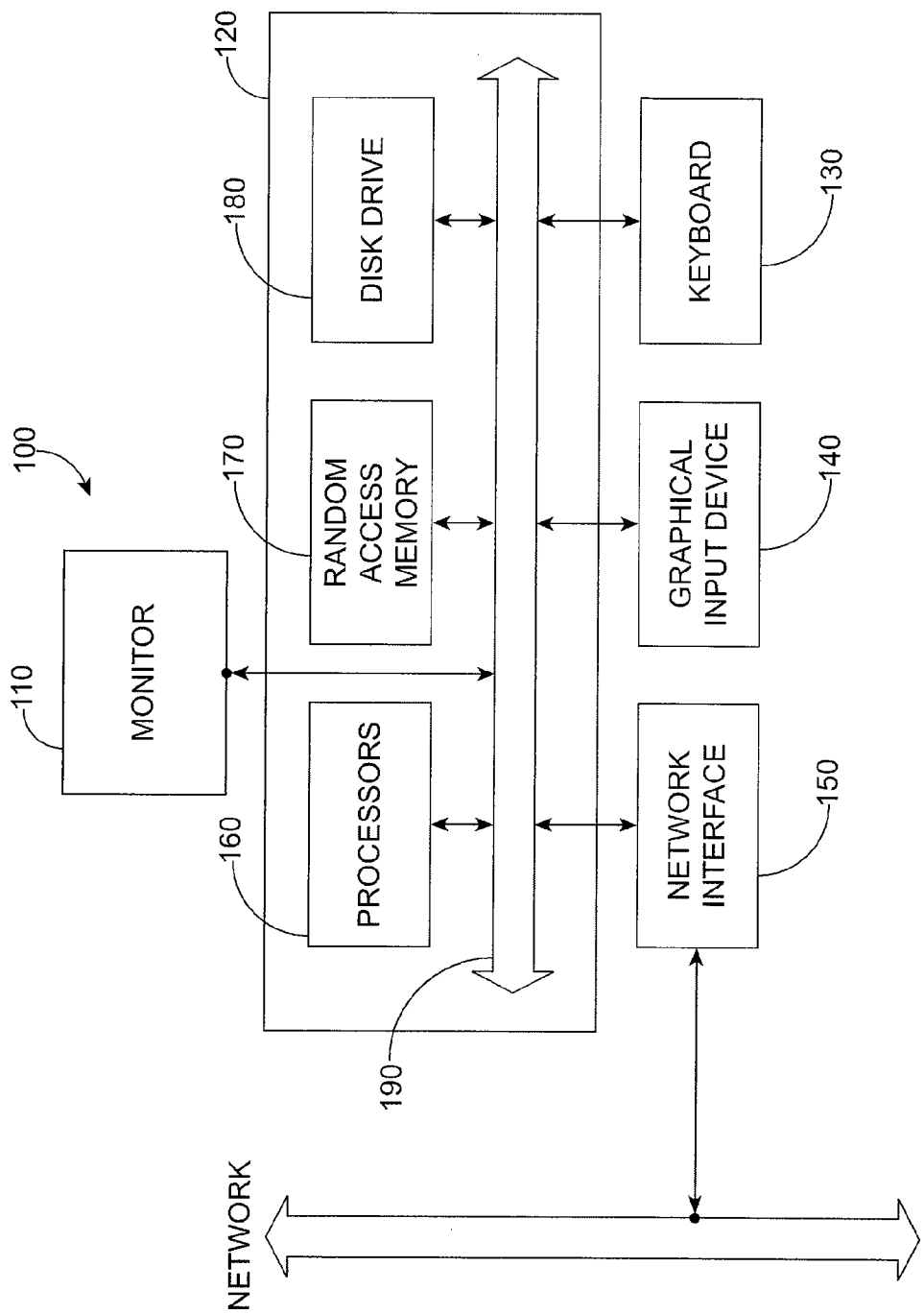
FIG. 1 is a block diagram of typical computer system according to an embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX—based operating system.

RAM 170 and disk drive 180 are examples of tangible media configured to store data such as image files, geometrical descriptions of objects, scene descriptor files, specifications of illumination sources, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Core™ or Pentium™ microprocessors from Intel; Opteron™ or AthlonXP™ microprocessors from Advanced Micro Devices, Inc; and the like. Further, other types of operating systems are contemplated, such as Windows® Vista, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Figure 3A:
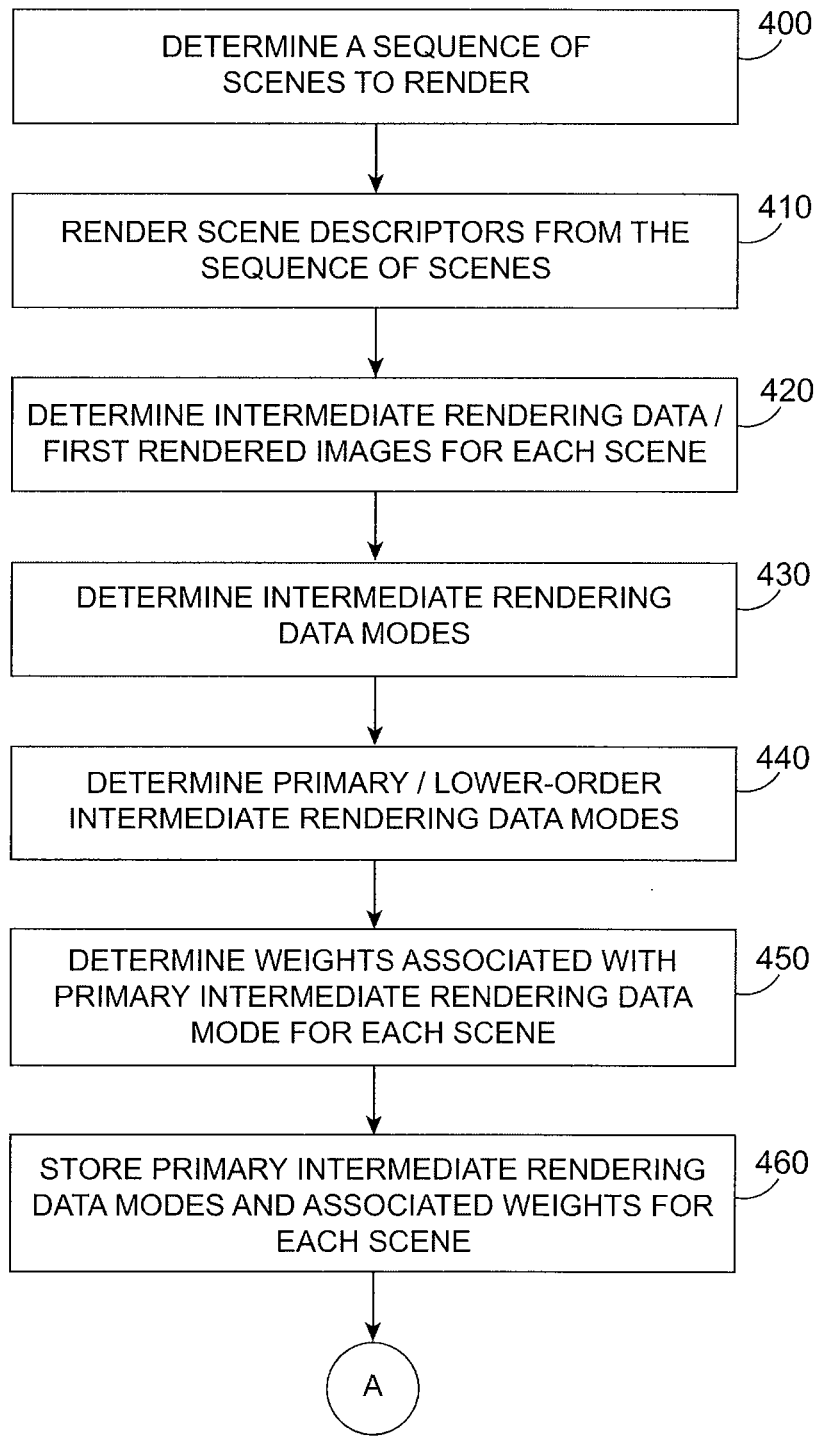
FIGS. 3A-B illustrates a block diagram of a process according to one embodiment of the present invention.
Figure 3B:
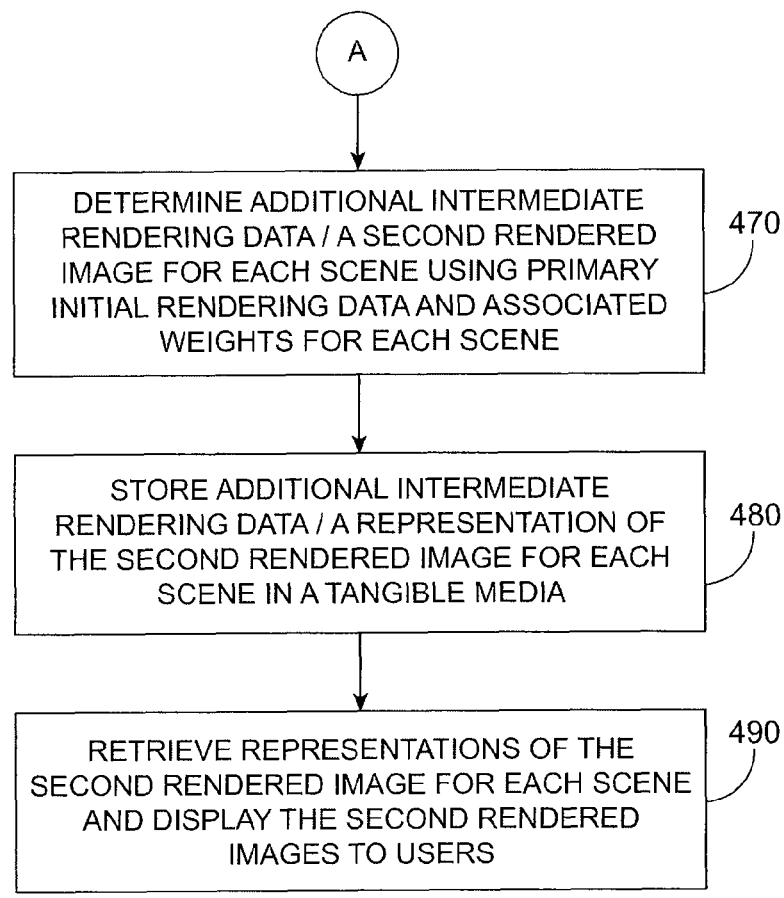

FIGS. 3A-B illustrate a block diagram of a process according to one embodiment of the present invention. More specifically, FIGS. 3A-B provide a high-level illustration of one embodiment.

In various embodiments of the present invention, initially, a set of related scenes descriptors to be rendered ("a sequence") is determined and specified, step 400. In various embodiments, a scene descriptor includes a geometric description of objects, illumination sources, and camera positions specified by one or more users, such as an animator, a set dresser, a lighter, a director, and the like. In various embodiments, the definition of each scene descriptor may be performed by using conventional computer animation tools, the description of which is beyond the scope of the present patent disclosure.

In various embodiments, it is first desired to compute an animated sequence of indirect illumination images quickly. One simple way of doing this is to reduce the number of ray samples. However, as mentioned previously, this may produce noisy images that flicker when played in an animation. A key observation by the inventors is that although the individual pixels are noisy, correlation in the temporal domain still provides important illumination information. For instance, if the illumination was static over the animation, averaging the pixel values over time results in a more accurate value for the pixel. The inventors have realized that these techniques are similar to a technique of negative stacking used by astronomers. For example, by taking 2 or more original negatives of the same object and stacking them, the signal in the resulting image is increased while the noise, being independent, actually cancels out and is reduced.

A slightly more complex embodiment is when the lighting scales linearly over time. In such embodiments, one can determine the linear lighting animation that best fits the noisy images and can use this as the final animation. The inventors thus suggest a more general approach. If bases or modes for the illumination in the animation can be determined, in various embodiments, the noisy animation can be projected onto theses basis to produce final, noise-reduced animation images.

As illustrated in FIGS. 3A-B, the next step is to perform a low-sampling-resolution rendering of the scene descriptors in the sequence, step 410. In various embodiments, rendering operations such as ray-tracing operations, surface shading operations, and the like are performed on the objects described in the scene descriptors.

In some embodiments of the present invention, the low-sampling resolution may yield noise due to the texture of a surface. For example, a surface of a sand dune may have very high frequency texture and thus with low-sampling resolution, the texture may be under-sampled. In such embodiments, a low-pass filter may be pre-applied to the surface texture, and then the low-sampling-resolution rendering may be performed. In various embodiments where a texture map is associated with a surface, a lower-frequency version of the texture map may be used for these initial low-sampling-resolution renders to reduce high frequency sampling noise.

In response to the rendering steps, "intermediate" or "initial" rendering data is determined, step 420. In various embodiments, intermediate rendering data may be visualized as a low-sampling-resolution rendered images based upon respective scene data, one or more texture maps, data on a set of voxels, or the like. In various embodiments, "low-sampling-resolution" refers to a resolution of ray-tracing that is typically not acceptable quality for final images. For example, the images in FIGS. 2A-2E may be considered "low-sampling-resolution" rendering. In various embodiments, "low-sampling-resolution" refers to cases where less than approximately 5 to 10, 10 to 15, 16-24 rays are cast per pixel, for example.

In various examples, the number of low-sampling-resolution "training" images may be the same as the number of scene descriptors in the sequence. In other embodiments, the number of low-sampling-resolution images may be less than the number of scene descriptors in the sequence. For example, the number of low-sampling-resolution images may be 50%, 66%, 75%, 80%, 90%, or the like.

Next, in various embodiments, based the intermediate rendering data, a series of intermediate rendering data modes are determined, step 430. In specific embodiments, the intermediate rendering data modes are a series of spatial structure functions, such as illumination modes.

As will be described in the example below, further below, the spatial structure functions represent characteristic illumination determined from the series of low-sampling-resolution images. In some embodiments, the spatial structure functions can be visualized as two dimensional images having pixel values corresponding to illumination values at a point on the image. In other embodiments of the present invention, the spatial structure functions can be associated with the specific object surfaces visualized in the scene. For example, in some embodiments, the spatial structure functions can be stored in texture maps, voxel maps, or the like associated with the objects.

In various examples, mathematically the following approximation relationship is used:

$$P(x,y,t) \sim = \text{Sum}(j=1,N)[ps(x,y,j)*pt(t,j)]$$

In this relationship, $P(x,y,t)$ is the non-direct illumination and N is the number of spatial structure functions. The number N is typically significantly smaller than the number of scene descriptors M in the sequence to reduce subsequent rendering time. In other words N<M. For example, N may be from 3 or greater, 5 or greater, or 10 to 15 spatial structure functions, and M may be approximately 100 scene descriptors or greater. Further, $ps(x,y,j)$ represents the spatial structure function and $pt(t,j)$ represents the illumination excitation amplitude values (excitations), discussed below. More generally, the relationship may be represented as $P(X,t)$ where X refers to a generalized coordinate system, such as x,y; x,y,z; two dimensional; three dimensional; or the like.

The inventors of the present invention have determined techniques such as singular value decomposition may be used to determine the spatial structure functions (and corresponding illumination excitation amplitude values) from the low-sampling-resolution images. Using this approach provides approximately an least squared error solution to the problem. In light of the present disclosure, one of ordinary skill in the art will recognize that other techniques may also be used to determine the intermediate rendering data modes, e.g. spatial structure functions.

In various embodiments, a scalar nonlinear function may be used in order for the least squared error to approximate the desired minimum subjective noise level, and an inverse nonlinear function is then used to determine the spatial structure functions. For example, in a scene with many dark areas, buzzing noise is more noticeable than in lighter areas, accordingly, low-sampling-resolution images may be multiplied with a nonlinear function to produce an image similar to a gamma correction function of >1. The spatial structure functions are then determined, as described above. These spatial structure functions are then multiplied by an inverse of the nonlinear function to approximately restore the intensities, for example with a gamma correction function of <1.

In the embodiment illustrated in FIGS. 3A-B, to reduce the amount of noise in the intermediate rendering data modes noise, e.g. illumination noise present in the sequence of scene descriptor, a number of more fundamental intermediate rendering data modes, e.g. spatial structure functions are determined, step 440. In various embodiments, the number of lower-order modes that may be used range from three to five modes (i.e. N={3,4,5}. In other embodiments, the number of modes may range from 2 to 8. In still other embodiments, the number of modes N may be pre-determined or set according to user preference and tuning. The number of modes N to select may depend upon the user viewing the modes and determining whether particular modes introduce unwanted noise, or not. In some embodiments of the present invention, the N intermediate rendering data modes, e.g. spatial structure functions determined in step 430 are the same as the N intermediate rendering data modes e.g. spatial structure functions determined in step 440.

Choosing a value of N that is too small may lead to the loss of some of the indirect illumination effects, while choosing a value that is too large may result in added noise structure in the solution. Since the reconstruction is extremely fast once the initial noisy image sequences are generated, M may be selected interactively by allowing a user to view the reconstructed sequence and having the user adjusting a slider.

In other embodiments, to further reduce the amount of noise specified in each spatial structure function, a linear spatial filter, such as a low-pass filter, a non-linear spatial filter such as a despeckle filter, or the like may operate on each intermediate rendering data mode, e.g. spatial structure function.

In other embodiments of the present invention, the number of intermediate rendering data modes, e.g. spatial structure functions, N may also be automatically determined selected by observing the approximation error and truncating the series at N. In some embodiments, the automatic system is based on the variance unexplained by the truncated principle component analysis (PCA) reconstruction. Knowing the percentage of unexplained variance when using x basis functions (e.g. illumination modes) (percentVar(x)), N is selected as the lowest x such that: (percentVar(x)$\leqq\epsilon$) and (percentVar(x)−percentVar(x+1))$\leqq\epsilon_{change}$ for a user defined $\epsilon$ and $\epsilon_{change}$. Intuitively, these criteria are directed towards the desire to stop adding basis functions (higher-order illumination modes) when adding the next one does not provide much benefit. For example, N may be the number of modes where the reduction in error is consistent with what one would expect from uncorrelated noise. In various embodiments of the present invention, well-known algorithms may be used. As disclosed above, values of N tend to be small, on the order of 3 to 5 modes, e.g. spatial structure functions for most animated scenes.

In various embodiments of the present invention, for each scene descriptor in the sequence, a set of excitation amplitude values are then determined corresponding to the modes, e.g. spatial structure functions determined in step 440 above, step 450. In various embodiments, the excitation amplitude values may be limited to non-negative values, positive values, or the like; the excitation amplitude values may be positive, negative, or zero values, and the like. In some embodiments, the excitation amplitude values are the excitation amplitude values determined in step 430, above. In other embodiments, the excitation amplitude values may be determined specifically within this step for each individual scene descriptor. The lower-order modes and the corresponding excitation amplitude values for each scene descriptor that are determined may then be stored for subsequent use, step 460.

In some embodiments of the present invention, a second rendering process may then be performed based upon scene descriptor data for each scene descriptor in the sequence, the intermediate rendering data modes, e.g. non-direct illumination contribution of each respective image, and the corresponding excitation amplitude values, to form additional intermediate rendering data, step 470. The additional intermediate rendering data may be used as input to further rendering computations or may be images. For example, in various embodiments, the additional intermediate rendering data may be visualized as high-sampling-resolution rendered images.

In specific embodiments, the additional intermediate rendering data, e.g. illumination contributions for a scene descriptor are determined according to the following equation:

$$P(x,y,t) = \text{Sum}(j=1, N)[ps(x,y,j) * pt(t,j)]$$

The parameters are the same as those discussed in the above equation.

In various embodiments of the present invention, this approach is roughly equivalent to temporally filtering the intermediate rendering data, e.g. non-direct illumination contributions, without attenuating spatial geometric components. In embodiments, intermediate rendering data modes may additionally be spatially smoothed with a filter.

In various embodiments, the set of modes, e.g. spatial structure functions and the set of excitation amplitude values were described to determine additional intermediate rendering data. For example, the additional intermediate rendering data may be used to form a set of images in which the value of each pixel represent the non-direct illumination contribution for each image corresponding to a scene. Additionally, in various embodiments, these additional intermediate rendering data may be used to represented an contribution "confidence" or "error" value or relationship for each pixel. As an examples, value may be similar to: 35±5; 20±1; 50±40; or the like.

Figure 4:
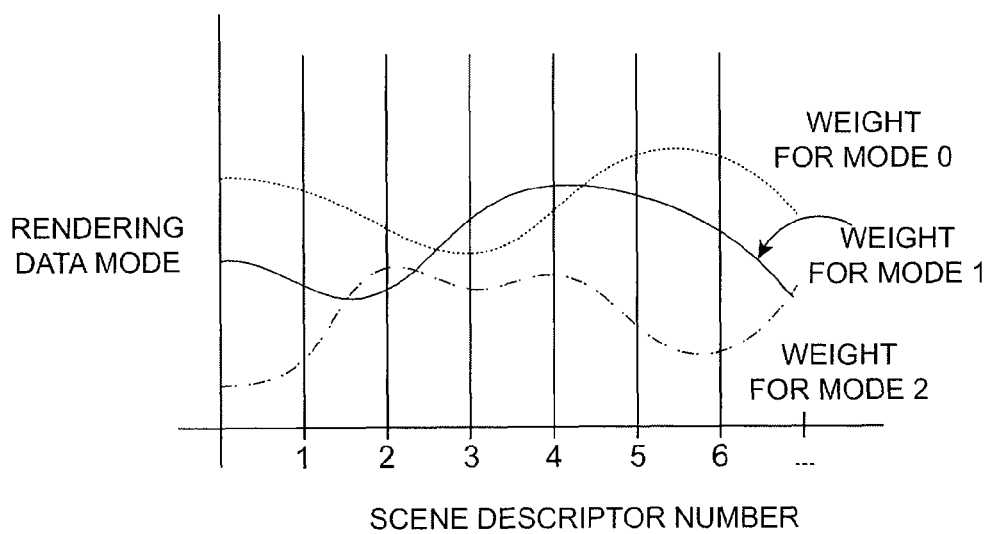
FIG. 4 illustrates an example according to an embodiment of the present invention.

In various embodiments of the present invention, excitation amplitude values associated with a particular mode, e.g. spatial structure function is normally expected to be smoothly varying in time, i.e. the excitation amplitude values in the set smoothly vary. See FIG. 4 for one example of an embodiment. In other embodiments, additional temporal smoothing functions may be applied to the set of excitation amplitude values.

Interestingly, in various embodiments, the intermediate rendering data modes, e.g. spatial structure functions are not determined based upon theoretical or predicted rendering data modes, instead, the intermediate rendering data modes are based upon actual rendered of scene descriptors in the sequence itself. As discussed above in one example, the "training set" (intermediate rendering data modes) for determining the spatial structure functions are based upon an initial rendering of the scene data. Accordingly, the determined modes spatial structure functions are expected to be uniquely suited and tuned for rendering the sequence of scene descriptors.

As a result of the above, the rendering data, e.g. illumination contributions are smoothed or attenuated in time within the final rendering of the scene descriptor data. However, the spatial geometry (e.g. edges) may be preserved and may not be significantly attenuated by embodiments of the present invention. In various embodiments, the resulting rendered images, therefore, are believed to be geometrically detailed and temporally smoothed (without sparking or buzzing) while the illumination contributions are more uniformly distributed. Such rendered images are thus believed to be much more visually appealing to viewers, than could be previously obtained.

In step 480, representations of the additional intermediate rendering data, e.g. rendered images are typically stored in memory. In various embodiments, the additional intermediate rendering data may be input for further rendering computations. In other embodiments, lossy or non-lossy representations of rendered images, such as .jpg or .tif, or the like are stored. Further, in various embodiments, the additional intermediate rendering data, e.g. rendered image representations may be stored in magnetic memory (e.g. hard disk drives, floppy drives); optical media (e.g. DVD, CD, HD DVD, Blu-ray DVD, holographic); semiconductor memory (e.g. RAM, ROM, Flash memory); film media (e.g. film stock).

Subsequently, representations of the rendered images may be retrieved from the same memory media, or different storage media, and be displayed to a user, step 490. As examples, rendered images of a sequence may be output to a user from a home theater system, may be output to users (e.g. audience) in a commercial theater, may be output to a user on a computer or other computing device (e.g. PDA, iPod, PSP, cell phone).

FIGS. 2A-E illustrates a series of screen shots in which illumination changes versus time. More specifically, FIGS. 2A-E illustrates examples of intermediate rendering data, e.g. low-sampling-resolution ray-traced rendered images of a three dimensional scene having fixed geometric elements where an illumination source moves circularly in space with respect to time.

Figure 2A:
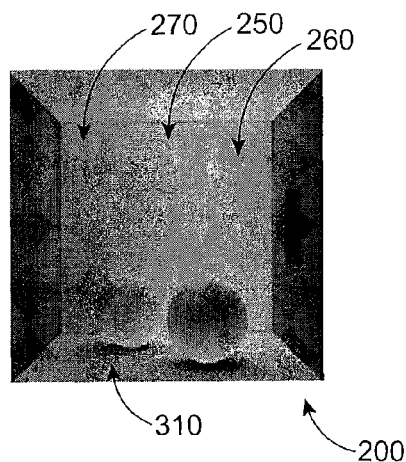
FIGS. 2A-E illustrates a series of screen shots in which non-direct illumination changes versus time.
Figure 2B:
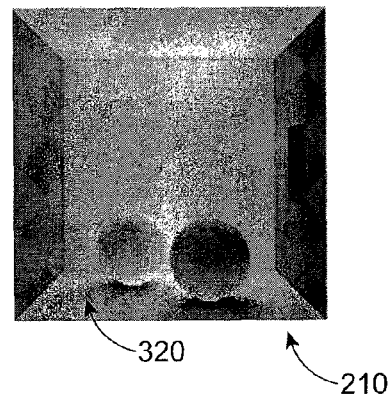
Figure 2C:
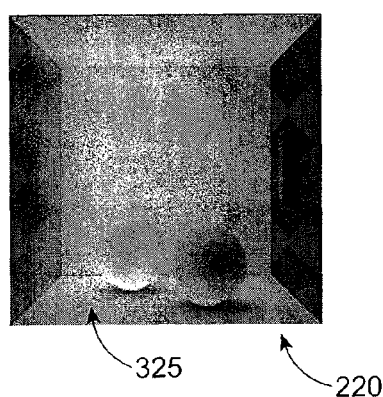
Figure 2D:
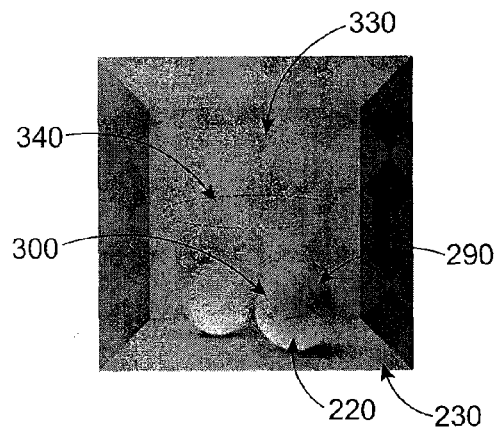
Figure 2E:
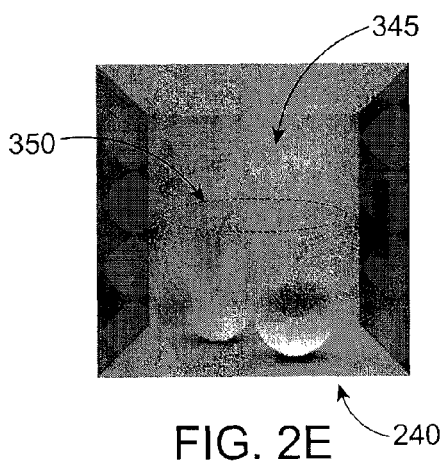

In FIG. 2A, a white indirect light source is positioned in the right, rear corner of the three-dimensional scene, and the image 200 is rendered. In FIG. 2B, the white light source is positioned in the center rear of the three-dimensional scene, and the image 210 is rendered. In FIG. 2C, the white light source is positioned in the left, rear corner of the three-dimensional scene, and the image 220 is rendered. In FIG. 2D, the white light source is positioned in the left wall of the three-dimensional scene, and the image 230 is rendered. In FIG. 2E, the white light source is positioned in the right, front corner of the three-dimensional scene, and the image 240 is rendered.

As described above, in FIG. 2A, the portion 250 of image 200 that represents a neutral colored rear wall includes a blue highlight 260 and a red highlight 270. As another example, in FIG. 2D, the portion 280 of image 230 that represent the front ball includes a blue highlight 290 and a red highlight 300.

As discussed above, in various embodiments of the present invention, spatial structure functions may be determined from the low-sampling-resolution images, such as illustrated in FIGS. 2A-2E.

FIGS. 5A-J illustrates various embodiments of the present invention. More specifically, FIGS. 5A-J illustrate intermediate rendering data modes, e.g. illumination modes determined using various embodiments of the present invention. According to the process described in FIGS. 3A-B, in this example, the low-sampling-resolution images in FIG. 2A-E could be used to determine the spatial structure functions illustrated in FIGS. 5A-J.

Figure 5A:
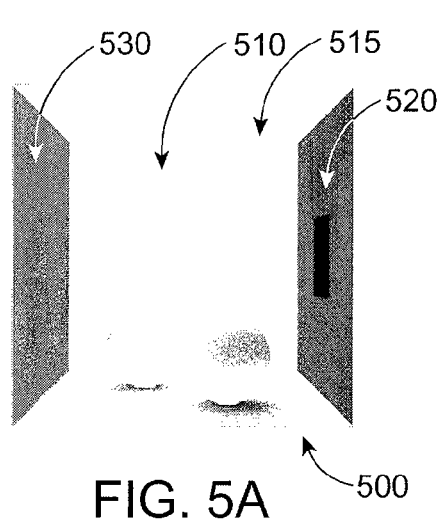
FIGS. 5A-J illustrate screen shots of examples of embodiments of the present invention.

FIG. 5A illustrates a two-dimensional image 500 whose pixel values represent a primary illumination mode contribution at the given locations in image 500. For example, the portion 510 of image 500 that represents a back wall is illustrated as primarily white in color; the portion 515 of image 500 that represents the ceiling is primarily white in color; the portion 520 of image 500 that represents the left wall is primarily blue in color; the portion 530 of image 500 that represents the left wall is primarily red in color; and the like.

Figure 5B:
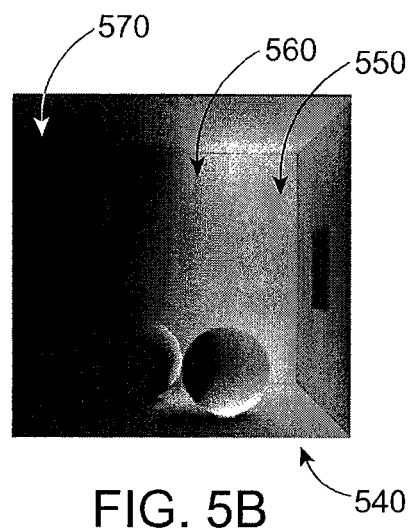

FIG. 5B illustrates a two-dimensional image 540 whose pixel values represent a second illumination mode contribution at the given locations. For example, the portions 550 and 560 of image 540 that represent the back wall and the ceiling are illustrated as mostly blue in color; the portion 570 of image 500 that represents the left wall is primarily black in color (i.e. not illuminated); and the like. In various embodiments, because an additive color model is used, locations having black values (r,g,b=0,0,0) do not appreciably contribute to the final illumination values.

Figure 5C:
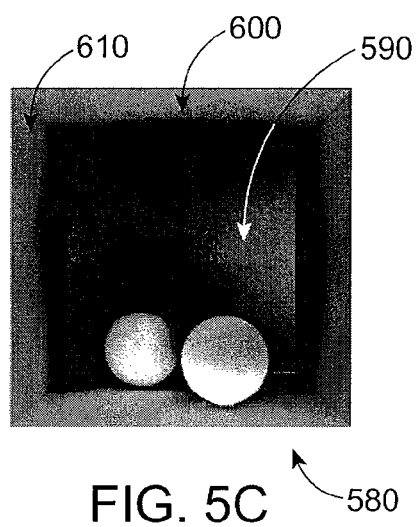
Figure 5D:
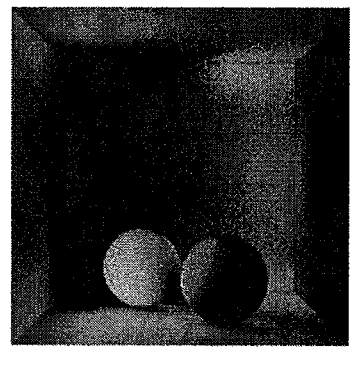
Figure 5E:
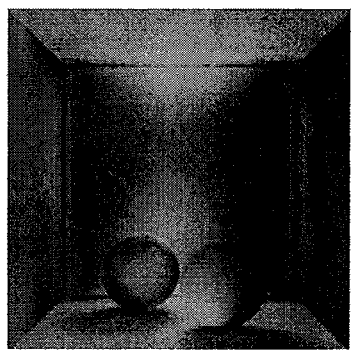
Figure 5F:
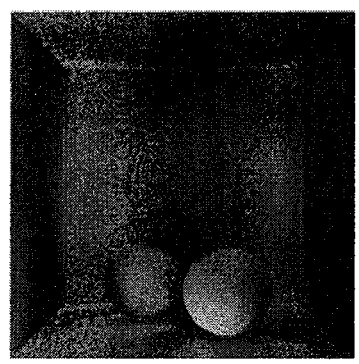
Figure 5G:
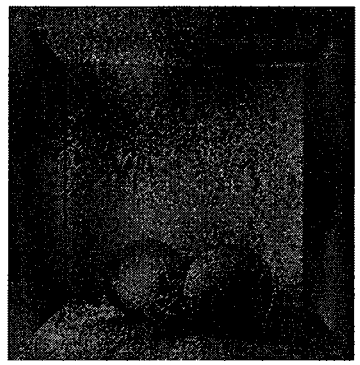
Figure 5H:
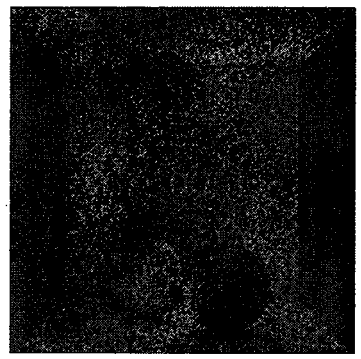
Figure 5I:
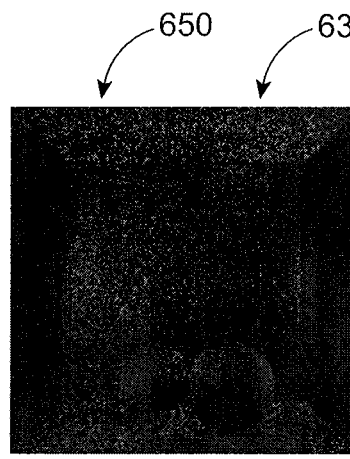

FIG. 5C illustrates a two-dimensional image 580 whose pixel values represent a third illumination mode contribution at the given locations. For example, the portions 590 and 600 of image 580 that represents the back wall and ceiling, respectively are illustrated are partially red, white, and black; and the like.

Figure 5J:
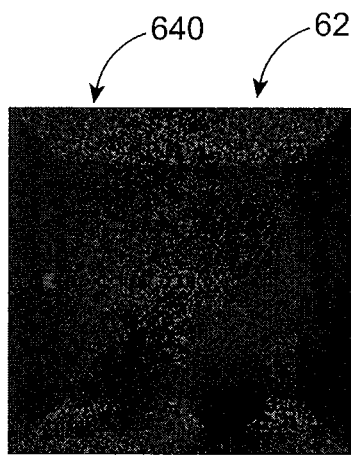
Figure 6A:
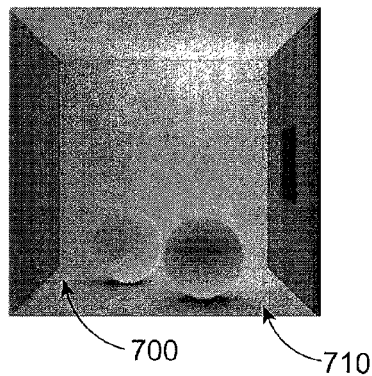
FIGS. 6A-E illustrates a series of screen shots in which non-direct illumination changes versus time according to embodiments of the present invention.
Figure 6B:
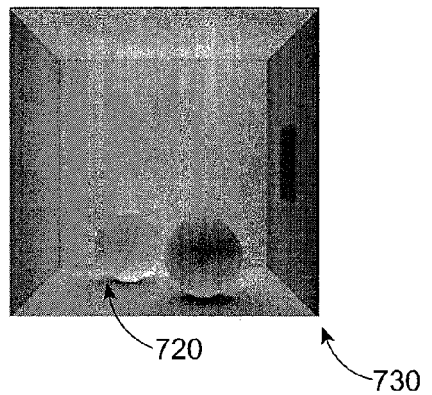
Figure 6C:
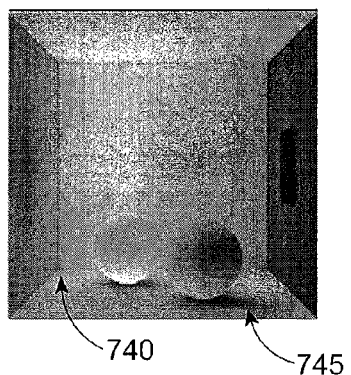
Figure 6D:
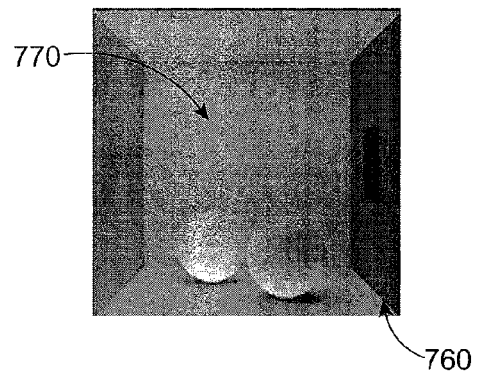
Figure 6E:
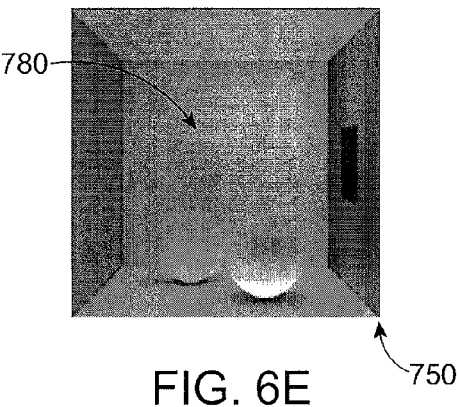

As illustrated in FIGS. 5A-5J, with successively higher illumination modes, typically the amount of illumination noise visually increases and the important geometric elements in the image visually decreases. For example, as illustrated in FIGS. 5D-5H, the geometry of the box and objects is somewhat visible, however by FIGS. 5T-5J, the geometry of the Cornell box and the spheres are more difficult to discern. Further, as also illustrated in FIG. 5T and 5J, the noise present on portions 620 and 630 of images 640 and 650 representing the back wall is high compared, for example to portion 510 in FIG. 5A.

The illumination modes in FIGS. 5A-J are merely illustrative of an example of illumination modes (10 modes) determined from the low-sampling-resolution images determined in step 420. As discussed above, in some embodiments a large number of illumination modes may be determined in step 430, above, and the higher order illumination modes are then eliminated in step 440. For example, in step 430, the 10 modes of FIGS. 5A-J may be determined, and in step 440, only the more important 6 modes, FIGS. 5A-F, are subsequently used. In other embodiments, only the most important N modes are determined in step 430, based upon an error determination. As an example, only illumination modes in FIGS. 5A-5F may be determined and used in step 450.

FIGS. 6A-E illustrate screen shots of examples of embodiments of the present invention. More specifically, the images in FIGS. 6A-E illustrate additional intermediate rendering data, e.g. rendered images formed using intermediate rendering data modes, e.g. spatial structure functions from step 440 and excitation amplitude values from step 450.

In this example, the images in FIGS. 6A-E have the same scene descriptors for the scenes in FIGS. 2A-E. As can be determined upon comparing images in FIGS. 6A-6E to respective images in FIGS. 2A-E, the amount of illumination noise is significantly reduced. For example, in FIGS. 6A-C portions 700, 720 and 740 of images 710, 730 and 745, respectively, that represent the floor appears smooth and is much less grainy than portion 310, 320 and 325 in FIGS. 2A-C. As another example, in FIG. 6E, a portion 740 of image 750 representing the back wall appears smooth and is also much less grainy than portion 350 in FIG. 2E. Additionally, portion 770 of image 760 and portion 780 of image 750 appear relatively similar. Accordingly, when animated, any flickering or sparkling is greatly attenuated.

Thus, as can be seen in FIGS. 6A-E, the amount of noise and noise artifacts that are attributed to low-sampling-resolution ray tracing of non-direct illumination sources, is greatly decreased using embodiments of the present invention. Further, when animated, the amount of sparkling or buzzing is also greatly reduced.

Various embodiments described above are particularly useful for sequences of scene descriptors where the objects in the scene are stationary and the cameras are locked, but the lighting or illumination may vary. These embodiments were described for ease of understanding, and such limitations are not required for other embodiments of the present invention.

In various embodiments of the present invention, cameras and objects may move within the images. A difficulty with storing the illumination at pixel locations when using a moving camera is that the temporal changes at a pixel would encode both illumination changes as well as changes due to the camera motion (such as visibility changes). In various embodiments, the indirect illumination are computed at the same set of object space positions for each frame, however the results are stored in a point cloud or texture map. Since the object space points are fixed, the temporal variation of each value is typically due only to changes in the illumination (in addition to the noise). Therefore, the point clouds or textures can be denoised using the same basis projection technique used for images in the previous section. For example, when the indirect illumination is needed for the final render, it can be accessed via a lookup into these smoothed point clouds or textures. Additionally, in various embodiments, rigidly moving objects can be handled in the same manner as a moving camera, by storing the results in an object space point cloud, voxel maps, texture map or similar structure.

In still other embodiments, deforming objects require the use of a rest or reference object with a static set of sample points. The indirect illumination should be computed for each frame at points and mapped to and from the reference object on the deformed object that correspond to the points on the reference/rest object. By storing these illumination values at the reference sample positions (using either a point cloud or texture map), these deforming objects can be denoised similarly to rigid objects.

Figure 7A:
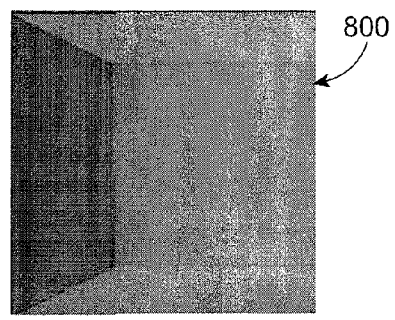
FIGS. 7A-F illustrates another example according to embodiments of the present invention.
Figure 7B:
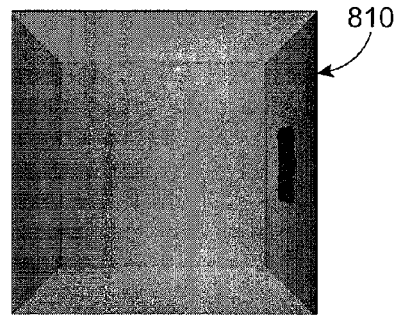
Figure 7C:
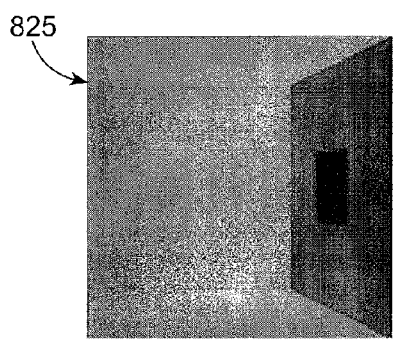
Figure 7D:
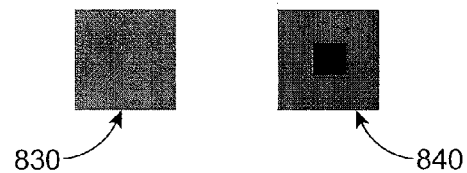
Figure 7E:
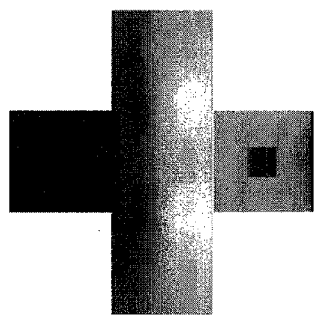
Figure 7F:
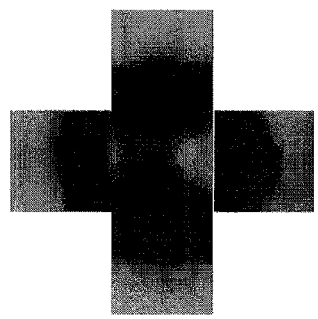

FIGS. 7A-F illustrates another example according to embodiments of the present invention. FIGS. 7A-C illustrates example images 800, 810 and 825. Initially, the camera is aligned with the right wall of the box in FIG. 7A to, the camera moves to the middle of the box in FIG. 7B, and then becomes aligned with the left wall of the box in FIG. 7C. Using the principles above, a series of spatial structure functions are determined. As stated above, in some embodiments where a camera or objects move in a scene, the spatial structure functions can be mapped to texture maps of object surfaces in the scene, voxel maps of objects in the scene, or the like. FIGS. 7D-F each illustrate examples of spatial structure functions: FIG. 7D illustrates a primary or zeroth order spatial structure function, FIG. 7E illustrates a first order spatial structure function, and FIG. 7F illustrates a second order spatial structure function. As can be seen, for example in FIG. 7D the functions can be visualized as an "unwrapped" images or series of separate images. The "unwrapped" images may be simple or complex, or one or more texture images, depending upon the complexity of the objects represented. In this example, spatial structure functions are shown for right wall 840 and left wall 830. In embodiments where objects are present or objects move within a scene, the spatial structure functions are also determined for each object and stored within separate texture maps associated with the objects' surfaces, within separate voxel maps associated with the objects or the like.

Many changes or modifications are readily envisioned. In light of the above disclosure, one of ordinary skill in the art would recognize that many different techniques may be used for the different steps. For example, in some embodiments of the present invention, steps 400-460 may be performed off-line and prior to rendering time. Accordingly, the rendering time required to render the images in the sequence of images should be approximately the same, whether or not the illumination smoothing embodiments, described above, are used. However, as discussed above, the smoothness in illumination will still be much higher using the above techniques. In other embodiments, some of the steps described above may be part of the rendering pipeline and be performed at render time.

As one example, without using embodiments of the present invention, a rendering engine renders 100 separate images with non-direct illumination contributions calculated at 50 rays per pixel. In contrast, using embodiments of the present invention, the rendering engine renders 100 low-sampling-resolution images with illumination contributions calculated at 5 rays per pixel. However, using embodiments described above, the non-direct illumination contributions are effectively calculated at 500 rays per pixel (100×5). In this embodiment, the amount of time for the computation is decreased from 50 rays per pixel to 5 rays per pixel, a 10 times decrease. Accordingly, the time to perform such rendering is approximately 10 times less. Further, in this embodiment, the resolution increases from 50 rays per pixel to 500 rays per pixel. Accordingly, the reduction in noise and buzzing of the images greatly decreases.

Alternatively, the rendering time required to render the images in the sequence of images to the same level of illumination smoothness is dramatically decreased. For example, using embodiments of the present invention, a rendering engine renders 100 images with illumination contributions calculated at 10 rays per pixel for 10000 pixels at a rate of 1000 rays/second. This rendering would thus take approximately 10,000 seconds. Using embodiments of the present invention described above, the approximate effective number of rays cast per pixel is 1000 (10×100). In contrast without using embodiments of the present invention, a rendering engine renders 100 images with illumination contributions calculated at 1000 rays per pixel for 10000 pixels at a rate of 1000 rays/second. This rendering would thus take approximately 1,000,000 seconds. Accordingly, a one-hundred fold decrease in time, is obtained in this example while maintaining the same number of rays cast per pixel. Images generated by these embodiments of the present are still smoother from frame to frame because the higher order spatial structure functions are ignored. In still other embodiments, decreased noise and increased rendering times may be achieved.

The following experimental results provide an example of the amount of speed-up provided by embodiments of the present invention:

| Scene | # frames | Noisy Render time | Denoising | High Sample Render time | Speed-up Factor |
|---|---|---|---|---|---|
| Static object/ lighting | 100 | 1174 s | 56 s | 9948 s | 8.09× |
| Simple moving object | 150 | 1802 s | 68 s | 21960 s | 11.8× |
| Complex moving object (FIG. 9C) | 126 | 15125 s | 522 s | 345870 s | 22.1× |

Figure 9A:
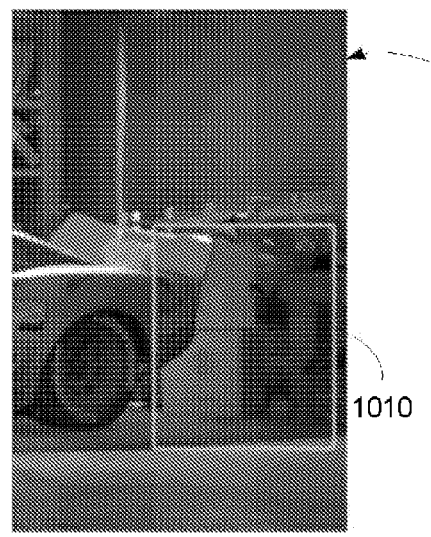
FIGS. 9A-C illustrate additional examples according to embodiments of the present invention.
Figure 9B:
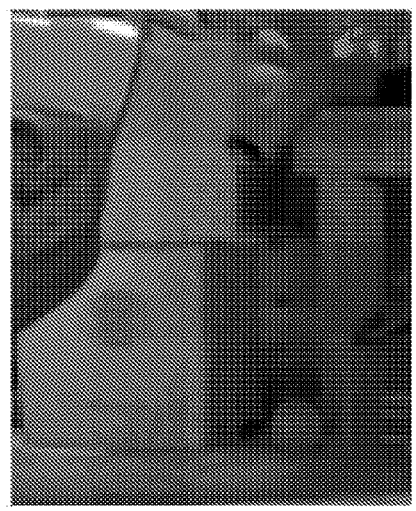
Figure 9C:

FIGS. 9A-C illustrate additional examples according to embodiments of the present invention. FIG. 9C illustrates a frame of animation 1000 rendered according to various embodiments of the present invention. FIG. 9B illustrates a portion 1020 of portion 1010 rendered according to a typical rendering technique. In contrast, FIG. 9C, illustrates a portion 1030 of portion 1010 rendered according to embodiments of the present invention. As can be seen by casual comparison, the noise is dramatically lower using embodiments of the present invention.

Depending upon the lighting in the sequence, non-direct illumination contribution calculations described may be relevant for all images in a sequence or only some images in the sequence. For example, in the first half of a sequence, an overhead illumination source illuminates the scene, and in the second half of a sequence, a small illumination source on the floor (e.g. representing a candle or nightlight) may illuminate the scene. Accordingly, in one embodiment, the sequence may be partitioned into two smaller sequences, each of which have non-direct illumination contributions determined as described above on all images in the smaller sequences (subsequences), respectively. In another embodiment, the non-direct illumination contributions may be calculated separately for the first half of the images in the sequence from the non-direct illumination contributions for the second half of the images in the sequence. For example, images 1-60 will have a set of spatial structure functions and images 61-130 will have a different set of spatial structure functions for determining the non-direct illumination contributions for the respective images.

In other embodiments of the present invention, the spatial structure function technique for determining non-direct illumination effects for each image need not be used for the entire image. For example, in some embodiments, spatial structure functions based upon low-resolution sampling are used to quickly determine non-direct illumination in brighter portions of the image. For example, 5 rays per pixel, can be used to determine the spatial structure functions for all images in the sequence. These spatial structure functions are used to determine the non-direct illumination for all regions in images in the sequence including (or excluding) regions of the images having larger error, in the sequence, as described below.

In various embodiments, to implement importance sampling, for images having pixels associated with low confidence, the rendering engine may cast additional sampling rays at these pixels, typically on a pixel-by-pixel basis. For example, for each pixel, a number of additional rays, such as 20, 50, 100, 500, or larger may be cast. The results of this high-resolution sampling are then typically filtered and combined with the non-direct illumination contributions determined above. In other embodiments, the high-resolution values overwrite the low-resolution values, with a spatial smoothing at the boundaries.

In other embodiments, to implement importance sampling, for images having pixels associated with low confidence, the number of illumination modes (basis functions) may vary on a pixel-by-pixel basis. For example, one pixel may be a combination of 4 illumination modes, a second pixel may require a combination of 5 illumination modes, etc. To reduce noise, a filtering operation may be performed such that the first pixel is a combination of 4.3 illumination modes, and the second pixel is a combination of the 4.7 lowest-order illumination modes. In still other embodiments, other schemes for implementing importance sampling solutions may be used.

Figure 8A:
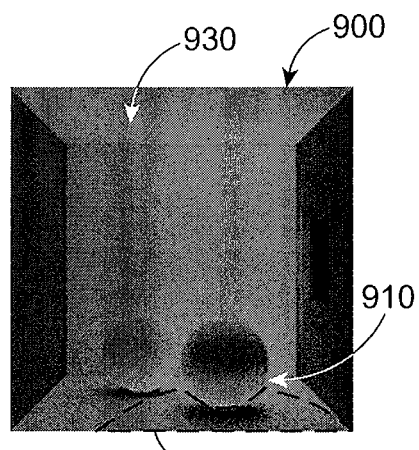
FIGS. 8A-C illustrate additional examples according to embodiments of the present invention.
Figure 8B:
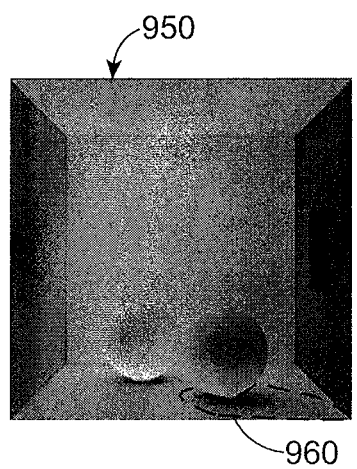
Figure 8C:
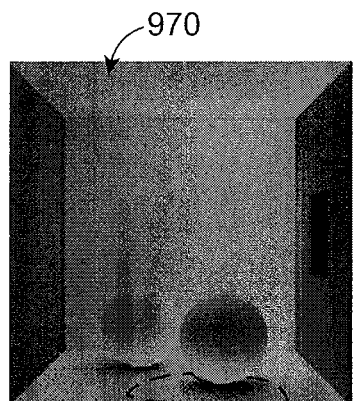

FIGS. 8A-C illustrate examples according to one embodiments of the present invention. More specifically, FIG. 8A illustrates an image 900 similar to the example shown above, including an object 910 and an area 920. In this example, area 920 represents an area that is roughly shadowed by object 910 at different times during the sequence. Area 930 represents regions excluding area 920. In various embodiments, pixels in area 920 may be dynamically determined by analysis of the error values or confidence factors, discussed above. The pixels may also be determined manually by a user. In this example area 920 includes regions which are in shadow only for portions of the sequence because of movement of the illumination source throughout the sequence. Accordingly, the "error" of pixels within this region is often higher than in more uniformly illuminated regions in the image.

In various embodiments, an area 920 may be relevant for all images in a sequence, or only some images in the sequence. For example, area 920 may be associated with a specific light source that is turned on half-way through the sequence. In such a case, non-direct illumination contributions for area 920 may be determined and only be relevant for images in the second half of the sequence.

As an example, in a first pass, a series of low-sampling resolution images are generated for each image in a sequence, such as 4 rays/pixel. Next, the spatial structure functions, excitation amplitudes, and confidence values are determined for the sequence of images. Then, based upon the spatial structure functions and upon the excitation amplitude values, the non-direct illumination contributions for each image in the sequence in all of image 900 or only of area 930 are determined. Additionally, in this embodiment, for each image in the sequence where area 920 is relevant, in a second pass, higher-sampling resolution contributions are determined for each pixel within area 920, such as 50 rays/pixel, 500 rays/pixel, or the like. The pixels within area 920 may be automatically determined in the rendering engine, based upon the error or confidence values.

FIGS. 8B-C illustrate additional examples according to embodiments of the present invention. In FIG. 8B, an image 950 including a shadow region 960 is illustrated, and in FIG. 8c, an image 970 is shown including shadow region 980.

In various embodiments, using the technique described above, a low-resolution sampling (e.g. 10 rays/pixel) is performed for a first pass for images 950 and 970. Based upon the techniques above, images are formed having reduced noise. Further, based upon the error factors determined from the low-resolution sampling, in this embodiment, the rendering pipeline automatically identifies pixels within region 960 in image 950 and within region 980 in image 970 as regions having higher error. This logically makes sense in this example when shadow region 960 or 980 appear in only a few images within the sequence of images. Accordingly, the rendering engine performs a higher-resolution sampling (e.g. 200 rays/pixel) for pixels in shadow region 960 for the image represented by image 950 and for pixels in shadow region 980 for the image represented by image 970. Then, the higher-resolution sampling results for areas 960 and 980 are combined with reduced noise images.

In various embodiments of the present invention, the sampling-resolution may be different for different sequences. For example, in one sequence, the sampling-resolution may be 3 rays/pixel, and in the next sequence, the sampling-resolution may be 5 rays/pixel, or the like. Similarly, referring to the example above where a sequence can be divided into distinct grouping of images, the sampling-resolution may be different between images in the first half and the second half of the sequence. For example, for images 1-60, the sampling-resolution may be 5 rays/pixel and for images 61-130, the sampling-resolution may be 8 rays/pixel, or the like.

In light of the above disclosure, one of ordinary skill in the art will understand that rendering of scenes may include rendering of objects, with or without a background, props, or the like. For example, an object may first be shaded using non-direct illumination smoothing, as described above, and then the object may be fully rendered and be composited into a live action background, a matte image, or the like. For example, the non-direct illumination smoothing techniques can be applied to a sequence of images that only include a three-dimensional object, such as an giant gorilla. Using embodiments of the present invention, the illumination of the three-dimensional character may then be smoothed in the sequence, as discussed above. Subsequently, the rendered giant gorilla, with smoothed non-direct illumination, can be composited onto a matte of a city with tall buildings, live action image, and the like. Accordingly, it is contemplated that the techniques are not limited to images entirely formed by computer animation.

The above disclosure has been illustrated with non-direct illumination contributions to rendered images corresponding to a plurality of scenes. However, as disclosed, the intermediate rendering data, the intermediate rendering data modes, and additional intermediate rendering data need not be represented specifically by rendered images. Instead, as the various rendering data may be the results of rendering calculations that are used for subsequent rendering calculations, thus not specifically identifiable as a rendered image.

Other embodiments of the present invention, may be applied to other types of initial or intermediate rendering data. Specifically, the determination of fundamental rendering data modes and specific weights for each scene descriptor, to determine additional intermediate rendering data, may be applied to virtually any type of rendering data determined during the rendering process. For example, embodiments of the present invention may be used to reduce sampling noise resulting from: global illumination calculations (described above), any stochastic or non-stochastic sampling process such as ray tracing of reflections or the like, sampling of surface normals, sampling of fine geometry or detail, sampling of moving objects (e.g. rotational), sampling with regards to depth of field determination (e.g. in-focus and out of focus areas), sampling with regards to transparent/translucent objects (e.g. clouds, smoke), sampling of procedural textures and other fine textures (e.g. hair, fur), ambient occlusion calculations, and the like.

As one example, embodiments of the present invention can incorporated techniques described in U.S. Pat. No. 4,897,806, assigned to the same assignee. For example, stochastic sampling techniques may be used to determine global illumination contributions, and the like, as illustrated above, for each scene in a sequence. Then, more fundamental global illumination modes may be determined based upon the global illumination contributions for each image. As illustrated above, based upon the more fundamental global illumination modes and a specific set of weights, the global illumination contribution for each scene is determined with reduced noise and/or decreased rendering time. More generally, stochastic sampled data for a first image may be combined with stochastic sampled data of other images to reduce the amount of noise in the first image, and the other images using techniques described above. In various embodiments, the stochastic sampled data may include illumination data, reflection data, geometric data, and the like.

Further embodiments can be envisioned to one of ordinary skill in the art after reading this disclosure. In other embodiments, combinations or sub-combinations of the above disclosed embodiments can be advantageously made. The block diagrams of the architecture and flow diagrams are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for determining a higher quality-plurality of intermediate rendering data performed by a computer system including a processor and memory that is programmed to perform the method comprises: performing by the processor of the computer system, a specific rendering operation for a plurality of scenes to form a lower quality plurality of intermediate rendering data for the specific rendering operation in the memory in response to a plurality of scene descriptor data associated with the plurality of scenes;
   processing by the processor of the computer system, the lower quality plurality of intermediate rendering data for the specific rendering operation from the memory to form a model for the plurality of intermediate rendering data in the memory;
   determining by the processor of the computer system the higher quality plurality of intermediate rendering data for the specific rendering operation in the memory in response to the model for the plurality of intermediate rendering data in the memory;
   performing by the processor of the computer system additional rendering operations to form a plurality of images with the processor, in response to the higher quality plurality of intermediate rendering data; and
   storing by the processor of the computer system representations of the plurality of images in a tangible media.

2. The method of claim 1 wherein the plurality of intermediate rendering data are selected from a group consisting of: global illumination data, data associated with surface normals, data associated with fine geometric descriptions, procedural texture data.

3. The method of claim 1 wherein the plurality of intermediate rendering data are selected from a group consisting of: data associated with movement, data associated with rotational motion, data associated with depth of field, transparency data, ambient occlusion data.

4. The method of claim 1 wherein the plurality of intermediate rendering data are stored in data structures selected from a group consisting of: an image, a set of voxels, a set of textures.

5. The method of claim 1
   wherein the specific rendering operation for the plurality of scenes comprises a sampling operation; and
   wherein processing by the processor of the computer system, the lower quality plurality of intermediate rendering data to form the model for the plurality of intermediate rendering data comprises:
      determining by the processor of the computer system, a plurality of intermediate rendering data modes in response to the lower quality plurality of intermediate rendering data for the specific rendering operation ; and
      determining by the processor of the computer system, a plurality of weights associated with the plurality of intermediate rendering data modes for each of the plurality of scenes with; and
   wherein determining by the processor of the computer system, the higher quality plurality of intermediate rendering data for the specific rendering operation comprises combining by the processor of the computer system, the plurality of intermediate rendering data modes and the plurality of weights associated with each of the plurality of intermediate rendering data modes .

6. The method of claim 5
wherein the lower quality plurality of intermediate rendering data for the specific rendering operation comprises a first plurality of two-dimensional images; and
wherein the higher quality plurality of intermediate rendering data for the specific rendering operation comprises a second plurality of two-dimensional images.

7. The method of claim 6 wherein each of the second plurality of two dimensional images has a noise frequency lower than a noise frequency of each of the first plurality of two dimensional images.

8. The method of claim 5 wherein the higher quality plurality of intermediate rendering data has fewer degrees of freedom compared to the plurality of intermediate rendering data.

9. The method of claim 1 wherein noise artifacts of the higher quality plurality of intermediate rendering data are reduced compared to noise artifacts for the lower quality plurality of intermediate rendering data.

10. The method of claim 5 wherein noise artifacts of the higher quality plurality of intermediate rendering data are reduced compared to noise artifacts for the lower quality plurality of intermediate rendering data.

11. The method of claim 6 wherein noise artifacts of the higher quality plurality of intermediate rendering data are reduced compared to noise artifacts for the lower quality plurality of intermediate rendering data.

12. A computer program product for determining a higher quality plurality of intermediate data comprising a non-transitory computer-readable tangible media including computer-executable code for a computer system including a processor includes:
    code that programs the processor to perform first rendering operation for a plurality of scenes to form a lower quality plurality of intermediate data for rendering operation in response to a plurality of scene descriptor data associated with the plurality of scenes;
    code that programs the processor to determine a model for the plurality of intermediate data in response to the lower quality plurality of intermediate data;
    code that programs the processor to perform second rendering operation for the plurality of scenes to form the higher quality plurality of intermediate data for the specific rendering operation in response to the model for the plurality of intermediate data;
    code that programs the processor to form a plurality of images with the processor, in response to the higher quality plurality of intermediate rendering data; and
    code that programs the processor to store the plurality of images in a tangible media.

13. The computer program product of claim 12 wherein the plurality of intermediate data are selected from a group consisting of: global illumination data, data associated with surface normals, data associated with fine geometric descriptions, procedural texture data.

14. The computer program product of claim 12 wherein the plurality of intermediate data are selected from a group consisting of: data associated with movement, data associated with rotational motion, data associated with depth of field, transparency data, ambient occlusion data.

15. The computer program product of claim 12 wherein the plurality of intermediate data are stored in data structures selected from a group consisting of:
    an image, a set of voxels, a set of textures.

16. The computer program product of claim 12 wherein the specific rendering operation for the plurality of scenes comprises sampling operation.

17. The computer program product of claim 16
wherein code that programs the processor to determine the model for the plurality of intermediate data comprises:
    code that programs the processor to determine a plurality of intermediate data modes in response to the first plurality of intermediate data for the first rendering operation; and
    code that programs the processor to determine a plurality of weights associated with the plurality of intermediate data modes for each of the plurality of scenes; and
wherein code that programs the processor to perform second rendering operation comprises combining the plurality of intermediate data modes and the plurality of weights associated with each of the plurality of intermediate data modes.

18. The computer program product of claim 17
wherein the lower quality plurality of intermediate data for the specific rendering operation comprises a first plurality of two-dimensional images; and
wherein the higher quality plurality of intermediate data for the specific rendering operation comprises a second plurality of two-dimensional images; and
wherein each of the second plurality of two dimensional images has sampling noise of a frequency lower than a frequency of sampling noise of each of the first plurality of two dimensional images.

19. The computer program product of claim 17 wherein the plurality of intermediate data comprises a first plurality of two-dimensional images; and wherein the higher quality plurality of intermediate data comprises a second plurality of two-dimensional images; and wherein two dimensional images from the second plurality of two dimensional images have a higher temporal coherence compared to two dimensional images from the first plurality of two dimensional images.

20. The computer program product of claim 13 wherein high frequency modes are attenuated in the higher quality plurality of intermediate data compared to the plurality of intermediate data.

21. The computer program product of claim 12 wherein the higher quality plurality of intermediate data comprises reduced noise artifacts compared to the lower quality plurality of intermediate data.

22. The computer program product of claim 16 wherein the higher quality plurality of intermediate data comprises reduced noise artifacts compared to the lower quality plurality of intermediate data.

23. The computer program product of claim 17 wherein the higher quality plurality of intermediate data comprises reduced noise artifacts compared to the lower quality plurality of intermediate data.

24. The computer program product of claim 18 wherein the higher quality plurality of intermediate data comprises reduced noise artifacts compared to the lower quality plurality of intermediate data.

25. A computer system comprises:
    a memory configured to store a plurality of scene descriptor data associated with a plurality of scenes; and
    a processor coupled to the memory, wherein the processor is configured to perform rendering operation for the plurality of scenes to form a lower quality plurality of intermediate rendering data for the specific rendering operation in response to the plurality of scene descriptor data, wherein the processor is configured to process the lower quality plurality of intermediate rendering data to form a model for the plurality of intermediate rendering data, wherein the processor is configured to determine a higher quality plurality of intermediate rendering data for the specific rendering operation in response to the model for the plurality of intermediate rendering data, wherein the processor is configured to form a plurality of images with the processor, in response to the higher quality plurality of intermediate rendering data, and wherein the memory is configured to store the plurality of images.

26. The computer system of claim 25 wherein the higher quality of plurality of intermediate rendering data are selected from a group consisting of: global illumination data, data associated with surface normals, data associated with fine geometric descriptions, procedural texture data.

27. The computer system of claim 25 wherein the higher quality plurality of intermediate rendering data are selected from a group consisting of: data associated with movement, data associated with rotational motion, data associated with depth of field, transparency data, ambient occlusion data.

28. The computer system of claim 25 wherein the higher quality plurality of intermediate rendering data are stored in data structures selected from a group consisting of: an image, a set of voxels, a set of textures.

29. The computer system of claim 25
wherein the specific rendering operation for the plurality of scenes comprises sampling operation;
wherein the processor is configured to determine a plurality of intermediate rendering data modes in response to the lower quality plurality of intermediate rendering data;
wherein the processor is configured to determine a plurality of weights associated with the plurality of intermediate rendering data modes for each of the plurality of scenes; and
wherein the processor is configured to determine the higher quality plurality of intermediate rendering data in response to the plurality of intermediate rendering data modes and the plurality of weights associated with each of the plurality of intermediate rendering data modes.

30. The computer system of claim 29
wherein the lower quality plurality of intermediate rendering data for the specific rendering operation comprises a first plurality of two-dimensional images; and
wherein the higher quality plurality of intermediate rendering data for the specific rendering operation comprises a second plurality of two-dimensional images.

31. The computer system of claim 30 wherein each of the second plurality of two dimensional images has a noise frequency lower than a noise frequency of each of the first plurality of two dimensional images.

32. The computer system of claim 29 wherein the higher quality plurality of intermediate rendering data has fewer degrees of freedom compared to the plurality of intermediate rendering data.

33. The computer system of claim 25 wherein noise artifacts of the higher quality plurality of intermediate rendering data are reduced compared to noise artifacts of the lower quality plurality of intermediate rendering data.

34. The computer system of claim 29 wherein noise artifacts of the higher quality plurality of intermediate rendering data are reduced compared to noise artifacts of the lower quality plurality of intermediate rendering data.

35. The computer system of claim 30 wherein noise artifacts of the higher quality plurality of intermediate rendering data are reduced compared to noise artifacts of the lower quality plurality of intermediate rendering data.

36. The computer system of claim 31 wherein noise artifacts of the higher quality plurality of intermediate rendering data are reduced compared to noise artifacts of the lower quality plurality of intermediate rendering data.

\* \* \* \* \*